United States Patent
Baroudi et al.

(10) Patent No.: US 11,722,852 B1
(45) Date of Patent: *Aug. 8, 2023

(54) SMARTPHONE CLUSTERING METHOD

(71) Applicant: KING FAHD UNIVERSITY OF PETROLEUM AND MINERALS, Dhahran (SA)

(72) Inventors: Uthman Baroudi, Dhahran (SA); Yousef Ahmed Ahmed Ali, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,212

(22) Filed: Sep. 28, 2022

Related U.S. Application Data

(63) Continuation of application No. 17/742,010, filed on May 11, 2022, now Pat. No. 11,490,228.

(51) Int. Cl.
*H04W 4/029* (2018.01)
*H04W 4/80* (2018.01)

(52) U.S. Cl.
CPC ............ *H04W 4/029* (2018.02); *H04W 4/80* (2018.02)

(58) Field of Classification Search
CPC ................................ H04W 4/029; H04W 4/80
(Continued)

(56) References Cited

U.S. PATENT DOCUMENTS 6,493,759 B1 12/2002 Passman et al.
7,035,240 B1 * 4/2006 Balakrishnan ........ H04W 84/18
709/224

(Continued)

FOREIGN PATENT DOCUMENTS

WO 2014/205692 A1 12/2014

OTHER PUBLICATIONS

Iterative Clustering for Energy-Efficient Large-Scale Tracking Systems Alfares et al. Sep. 2019 (Year: 2019).*
(Continued)

*Primary Examiner* — William Nealon
(74) *Attorney, Agent, or Firm* — Oblon, McClelland, Maier & Neustadt, L.L.P.

(57) ABSTRACT

A device, method, and non-transitory computer readable medium for using a smartphone clustering application. The method includes identifying, by each smartphone equipped with the smartphone clustering application, a cluster of neighboring smartphones equipped with the smartphone clustering application; determining a cluster head by each smartphone in the cluster; determining position by the cluster head; transmitting personal information by each smartphone to the cluster head; receiving the personal information from each of the neighboring smartphones by the cluster head; aggregating personal information with the personal information from each of the neighboring smartphones by the cluster head and generating aggregated personal information; combining, by the cluster head, its position with the aggregated personal information into a communication stream; identifying an access point by the cluster head; transmitting the communication stream to the access point; and transmitting the communication stream by the access point to a server side smartphone clustering application.

11 Claims, 9 Drawing Sheets

(58) Field of Classification Search
USPC .................................................. 455/456.1
See application file for complete search history.

(56) References Cited

U.S. PATENT DOCUMENTS

| | | | | |
|---|---|---|---|---|
| 7,961,673 | B2 * | 6/2011 | Jain | ................... H04W 52/367 |
| | | | | 455/519 |
| 2007/0160016 | A1 | 7/2007 | Jain | |
| 2010/0073686 | A1 * | 3/2010 | Medeiros | ................ H04L 67/12 |
| | | | | 356/615 |
| 2015/0173011 | A1 | 6/2015 | Das et al. | |
| 2018/0097845 | A1 * | 4/2018 | Chen | ................... H04L 43/065 |
| 2019/0141495 | A1 * | 5/2019 | Jha | ....................... H04L 45/306 |
| 2019/0215795 | A1 * | 7/2019 | Luecke | ................. H04W 8/005 |
| 2020/0213823 | A1 * | 7/2020 | Elkhail | ................... H04W 4/80 |
| 2021/0185608 | A1 * | 6/2021 | Ali | ......................... H04W 4/08 |

OTHER PUBLICATIONS

New Cluster Selection and Fine-Grained Search for k-means Clustering and Wi-Fi Fingerprinting Torres-Sospedra et al. Jun. 2020 (Year: 2020).*

Zhao, et al. ; A Social-Aware Resource Allocation for 5G Device-to-Device Multicast Communication ; IEEE Access vol. 5 ; Aug. 22, 2017; 14 Pages.

* cited by examiner

SMARTPHONE CLUSTERING METHOD

CROSS-REFERENCE TO RELATED APPLICATIONS

The present application is a Continuation of U.S. application Ser. No. 17/742,010, now allowed, having a filing date of May 11, 2022.

BACKGROUND

Technical Field

The present disclosure is directed to an efficient real-time tracking method and system using cooperative mobile clustering.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Group activities such as mountain climbing, hiking, guided tours, movement of military troops, etc., require continuous monitoring of every individual in the group, as the individual associated with the group may be unaware of the environmental conditions and the geographical locations. For example, in the tourism sector, when a large number of travelers moves in groups from one place to another, it is very important for a supervising entity (such as a travel agency or park service) to track the location of each of the travelers in the group to ascertain the safety of all the travelers. Further, the supervising entity needs to monitor the needs and location of all the tourists to track their progress according to a predefined traveling path. In some scenarios, such groups may be accompanied by a dedicated staff assigned by the supervising entity, however it is not feasible to allot dedicated staff for all the groups, due to limited human resources.

Presently, there are many group tracking systems available that facilitate communications with a person's mobile as well monitoring health conditions of the person. Most of the existing group tracking systems track a person by using the individual GPS information shared by the person's mobile in real-time. Tracking the person using the individual GPS information causes high-energy consumption and rapid depletion of the device's battery. Furthermore, known art and other conventional systems do not have the capability to efficiently and accurately locate the position of the traveler by utilizing the energy in an efficient and controlled manner.

Accordingly, it is one object of the present disclosure to provide systems and methods for the real time tracking of groups of people in an energy efficient manner which preserves the battery life of each mobile device.

SUMMARY

In an exemplary embodiment, a method for using a smartphone clustering application is disclosed. The method includes identifying a cluster of neighboring smartphones equipped with the smartphone clustering application by each smartphone equipped with the smartphone clustering application. The method further includes determining a cluster head by each smartphone in the cluster. The method further includes determining the position of the cluster head. The method further includes transmitting over near field communication, by each smartphone in the cluster, personal information to the cluster head. The method further includes receiving the personal information from each of the neighboring smartphones by the cluster head. The method further includes aggregating, by the cluster head, its personal information with the personal information from each of the neighboring smartphones, thus generating aggregated personal information. The method further includes combining, by the cluster head, its position with the aggregated personal information into a communication stream. The method further includes identifying an access point by the cluster head. The method further includes transmitting the communication stream to the access point by the cluster head. The method further includes transmitting the communication stream to a server side smartphone clustering application by the access point.

In another exemplary embodiment, a smartphone clustering application system is disclosed. The disclosed system includes a plurality of smartphones, an access point, a server side smartphone clustering application stored on a server and a native smartphone clustering application. The server side smartphone clustering application includes a first computing circuitry; one or more first processors; a first memory storing first program instructions, wherein the first program instructions are executed by the one or more first processors to perform server side smartphone clustering; a registration interface configured to register each smartphone with the server side application; a database configured to store personal information of an owner of each smartphone registered with the server side smartphone clustering application; a network interface configured to transmit communications to the plurality of smartphones. The native smartphone clustering application is configured to be downloaded from the server side smartphone clustering application by each smartphone, wherein each smartphone includes a second computing circuitry; a communications circuit including a near field antenna, a WiFi antenna and a radio frequency antenna; one or more second processors; a second memory storing second program instructions, wherein the second program instructions are executed by the one or more second processors to: identify a cluster of neighboring smartphones equipped with the native smartphone clustering application; determine a cluster head; transmit, over the near field antenna, personal information to the cluster head; wherein the smartphone of the cluster head is configured to: receive the personal information from each of the neighboring smartphones; aggregate, by the second computing circuitry of the cluster head, its personal information with the personal information from each of the neighboring smartphones, and generate aggregated personal information; determine its position; combine, by the second computing circuitry of the cluster head, its position with the aggregated personal information into a communication stream; transmit, by the WiFi antenna, the communication stream to the access point; and wherein the access point is configured to transmit the communication stream to the server side smartphone clustering application.

In another exemplary embodiment, a non-transitory computer readable medium having instructions stored therein that, when executed by one or more processors, cause the one or more processors to perform a method for using a smartphone clustering application. The method includes identifying, by each smartphone equipped with the smartphone clustering application, a cluster of neighboring smartphones equipped with the smartphone clustering application.

The method further includes determining, by each smartphone in the cluster, a cluster head. The method further includes determining, by the cluster head, its position. The method further includes transmitting over near field communication, by each smartphone in the cluster, personal information to the cluster head. The method further includes receiving, by the cluster head, the personal information from each of the neighboring smartphones. The method further includes aggregating, by the cluster head, its personal information with the personal information from each of the neighboring smartphones, thus generating aggregated personal information. The method further includes combining, by the cluster head, its position with the aggregated personal information into a communication stream. The method further includes identifying, by the cluster head, an access point. The method further includes transmitting, by the cluster head, the communication stream to the access point. The method further includes transmitting, by the access point, the communication stream to a server side smartphone clustering application.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
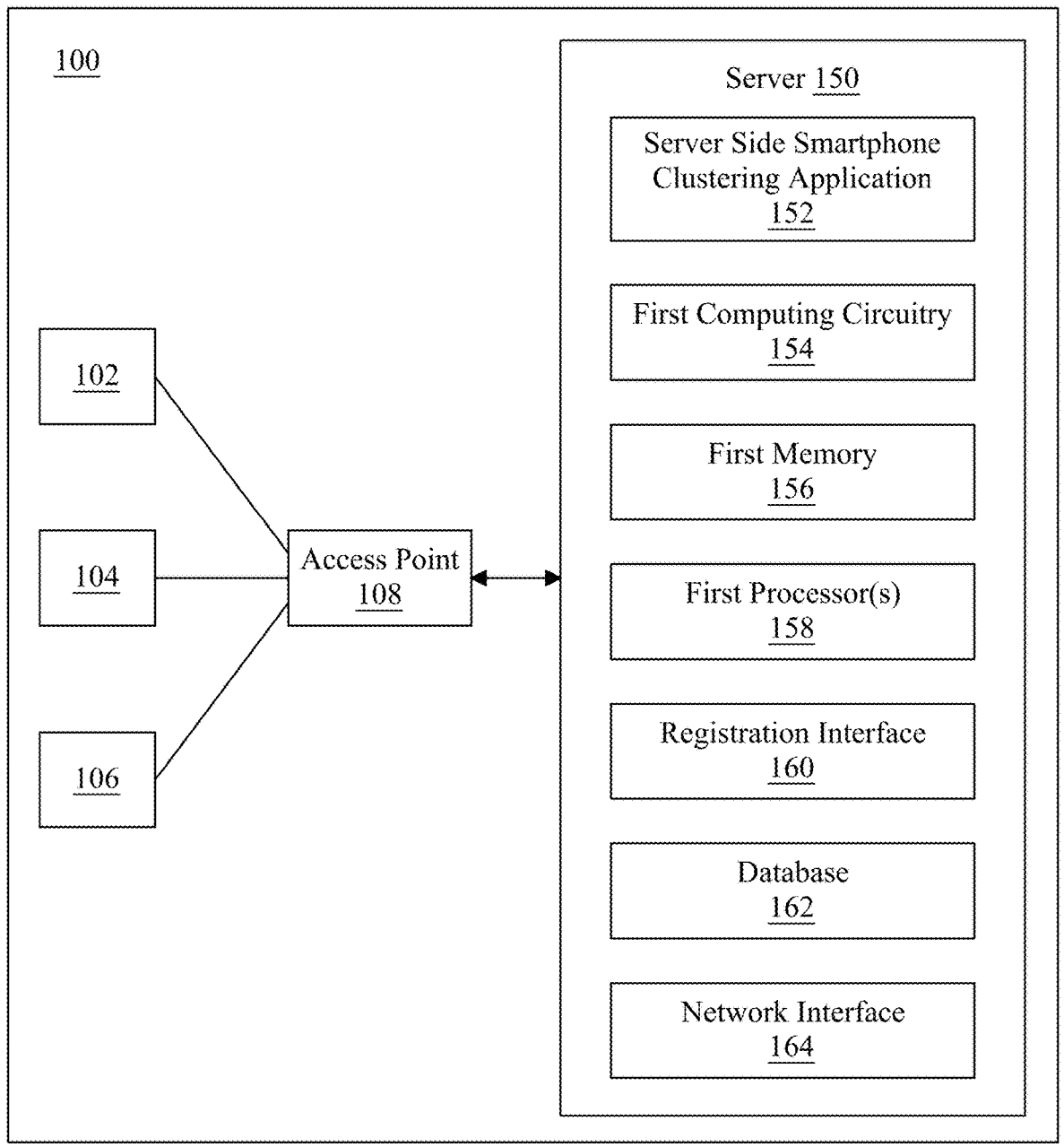
FIG. 1 illustrates a block diagram of a smartphone clustering application system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a system, method, and non-transitory computer readable medium method for using a smartphone clustering application. The present disclosure provides a solution for real-time tracking of a plurality of smartphones using cooperative mobile clustering that determines a position of each smartphone in a cluster by near field communications. Aspects of the present disclosure describe a process which identifies a cluster of the plurality of smartphones and determines a cluster head in the identified cluster. The cluster head is configured to perform position determination (such as Global Positioning Service (GPS) positioning) of smartphones in the cluster. Only the cluster head is required to utilize position determination for the cluster. This reduces the cost of communication for the cluster, as non-cluster head smartphones do not determine their position using GPS, only their relative position to the cluster head based on near field communication. The cluster head is configured to receive personal information, such as medical condition information of the smartphone user, from each of the smartphones. The cluster head transmits its real-time position along with the received personal information of each of the smartphones of the cluster to a server for analysis. The present disclosure relates to a mobile clustering application that may be downloaded onto each smartphone (i.e., a "native" smartphone clustering application) in a cluster of smartphones.

In various aspects of the present disclosure, non-limiting definitions of one or more terms that will be used in the document are provided below.

The term "smartphone" refers to a portable communications device that combines mobile telephone and computing functions into one unit. A smartphone is distinguished from previous generations of mobile phones by their stronger hardware capabilities and extensive mobile operating systems, which facilitate wider software, internet (including web browsing over mobile broadband), and multimedia functionality (including music, video, cameras, and gaming), alongside core phone functions such as voice calls and text messaging. Smartphones typically contain a number of metal—oxide—semiconductor (MOS) integrated circuit (IC) chips, include various sensors that can be leveraged by pre-included and third-party software (such as a magnetometer, proximity sensors, barometer, gyroscope, accelerometer and more), and support wireless communications protocols (such as Bluetooth, Wi-Fi, satellite navigation, LTE, 3G, 4G, and the like).

FIG. 1 illustrates a block diagram of a smartphone clustering application system 100 (hereinafter interchangeably referred to as "the system 100"), according to one or more aspects of the present disclosure.

Referring to FIG. 1, the system 100 includes a plurality of smartphones (102, 104, 106), an access point 108, and a server 150. The plurality of smartphones (102, 104, 106) is configured to communicate with each other by a near field communication means, such as Bluetooth. Each of the smartphones (102, 104, 106) is configured to download a native smartphone clustering application 200 from a server side smartphone clustering application 152. In an aspect of the present disclosure, each smartphone includes communication capabilities (e.g., through cellular, Bluetooth, hotspot and/or Wi-Fi) allowing communication with other devices and/or a centralized server. For example, and without limitation, the smart phone may refer to a mobile device, PDA, desktop computer, GPS device, automotive navigation system, wearable object, a cellular telephone, a tablet, a netbook, a wireless terminal, a laptop computer, a wearable computer device, or any other portable computing device.

The server 150 stores the server side smartphone clustering application 152. The server side smartphone clustering application 152 includes a first computing circuitry 154, a first memory 156, one or more first processors 158, a registration interface 160, a database 162, and a network interface 164. The server 150 is configured to receive a communication stream transmitted from the access point 108.

The first computing circuitry 154 includes input/output facilities. The first computing circuitry 154 may be configured to communicate with the access point 108 via the input/output facilities.

The first memory 156 is configured to store first program instructions. In one embodiment, the first memory 156 may include any computer-readable medium known in the art including, for example, a volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes.

The one or more first processors 158 (interchangeably referred to as "first processor 158") cooperate with the first memory 156 to receive and perform a server side smartphone clustering.

In operation, when the smartphone downloads and installs the native smartphone clustering application 200 (FIG. 2) from the server side smartphone clustering application 152, the registration interface 160 is configured to register each smartphone with the server side smartphone clustering application 152. The registration interface 160 may be configured to seek an owner to provide personal information such as name, age, address, contact number, medical history, name of medical professional consulted by the owner of the smartphone, an itinerary (details of source point and destination point) and such like. In some examples, the server side smartphone clustering application 152 is configured to analyze the email, messages, profile information, social networks, and/or other information to obtain the personal information.

Further, the registration interface 160 is communicatively coupled with the database 162. The database 162 is configured to store a profile of the owner of each smartphone having personal information of the owner registered with the server side smartphone clustering application 152.

The network interface 164 is configured to transmit communications between the server 150 to the plurality of smartphones (102, 104, 106) to register the smartphones with the server side smartphone clustering application and download a native smartphone clustering application. In FIG. 1, for example three smartphones (102, 104, 106) are shown in the cluster, however, there can be more than three smartphones in the cluster. In operation, upon executing the first program instructions of the server side smartphone clustering application 152, the first processor 158 is configured to receive and analyze a communication stream from the access point 108. The first processor 158 is configured to extract the position information and the personal information from the received communication stream. The first processor 158 is communicatively coupled with the database 162 having profile of each of the smartphone. The stored profile of each smartphone includes name, age, address, contact, medical conditions, preferred/treating medical professional used by the owner of the smartphone, and itinerary of the owner of the smartphone. The first processor 158 is configured to correlate the extracted position information with the stored itinerary of the owner of the smartphone fetched from the database 162. In the event where the extracted position of the smartphone does not match the expected position based on the itinerary, the server 150 is configured to generate a notification message. In an aspect of the present disclosure, the notification message includes the itinerary of the owner of the smartphone and the position of the cluster head.

Using the network interface 164, the server 150 is configured to transmit the generated notification message to the plurality of the smartphones (102, 104, 106) and to an emergency response facility. In an aspect of the present disclosure, the emergency response facility is any one of a law enforcement agency, a medical crew, and the like.

In an operative example, on executing the first program instructions of the server side smartphone clustering application 152, the first processor 158 is configured to correlate the extracted personal information for each smartphone with medical conditions of the owner of the smartphone fetched from the database 162. If the extracted personal information indicates a medical emergency of the owner of the smartphone, then the first processor 158 is configured to generate a notification message. In an aspect of the present disclosure, the notification message includes the personal information of the owner of the smartphone, the medical conditions of the owner of the smartphone, and the position of the cluster head. Using the network interface 164, the server 150 is configured to transmit the generated notification message to the medical professional associated with the stored profile of the owner of the smartphone. In an example, the server 150 is configured to transmit the generated notification message to an available medical professional near the cluster head.

In an aspect of the present disclosure, when the owner of the smartphone reports he is in danger, the owner of the smartphone may send an SOS message as a part of the personal information using the native smartphone clustering application 200. Alternatively, when the extracted personal information indicates unexpected changes in the owner's activities such as rapid movements, increased heart rate, or a combination thereof, the server side smartphone clustering application 152 detects that the owner of the smartphone in the cluster may be under attack. After detecting the attack conditions, the first processor 158 is configured to generate a notification message. In an embodiment, the notification message includes the personal information of the owner of the smartphone, and the position of the cluster head. Using the network interface 164, the server 150 is configured to transmit the generated notification message to a law enforcement agency.

In one or more implementations, the server 150, using the first processor 158, may be configured to monitor for a dangerous event occurring near the position of the cluster head. For example, the server side smartphone clustering application 152 can monitor local news for updates on tornadoes, heavy storm, heavy rain, earthquake, fire, landslide etc. In another example, the native smartphone clustering application can sense sudden changes in various environmental factors such as temperature, pressure, humidity, and determines a dangerous event. Responsive to determining the dangerous event, the native smartphone clustering application is configured to send an emergency message towards the server side smartphone clustering application. After identification of the dangerous event, the server 150 generates an alert and transmits the generated alert to each smartphone in the cluster via the network interface 164. In an aspect, the alert includes emergency escape routes. In some examples, the dangerous event may be a fire, landslide, heavy storm, tornado, and likewise.

Figure 2:
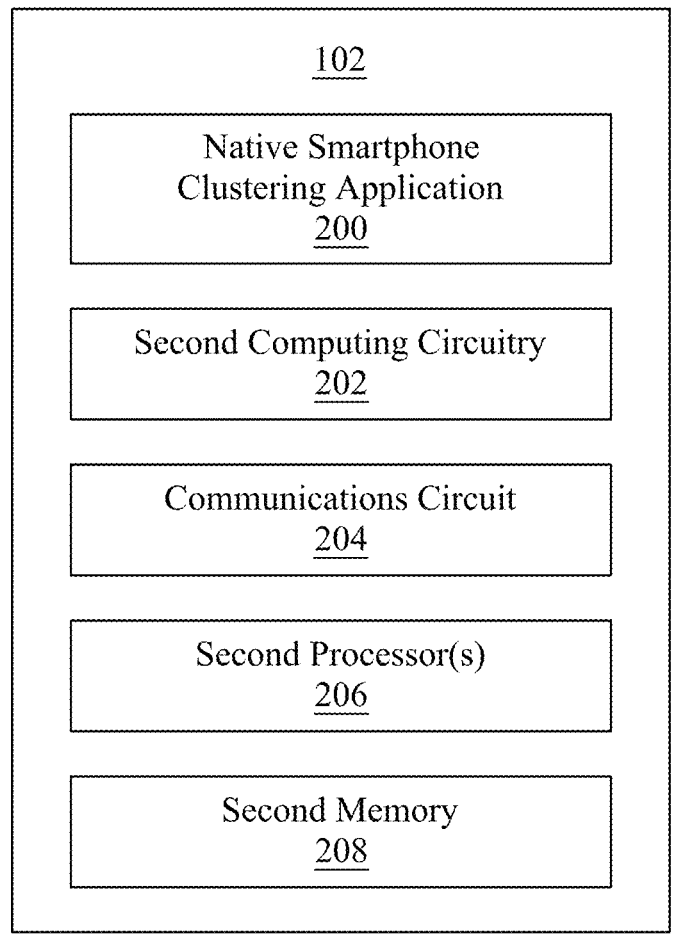
FIG. 2 illustrates a block diagram of a smartphone using a native smartphone clustering application, according to certain embodiments.

FIG. 2 illustrates a block diagram of a smartphone using the smartphone clustering application, according to certain embodiments. Once the native smartphone clustering application has been downloaded to the smartphone, the native smartphone clustering application communicates with neighboring smartphones through near field communications. The native smartphone clustering application of each smartphone determines whether it is the cluster head based on a cost function described below.

As shown in FIG. 2, each smartphone 102 comprises, inter alia, a native smartphone clustering application 200, a second computing circuitry 202, a communications circuit 204, one or more second processors 206 (interchangeably referred to as "second processor 206"), and a second memory 208. Each smartphone 102 is configured to download the native smartphone clustering application 200 from the server side smartphone clustering application 152.

In an aspect, the second computing circuitry 202 includes input/output facilities. The second computing circuitry 202 may be configured to communicate with other smartphones via the input/output facilities coupled as a circuit arrangement and/or components for enabling input/output operations with the second computing circuitry 202 and other components of the smartphone.

The communications circuit 204 has at least one antenna for transmitting and receiving signals. In some examples, at least one antenna is a near field antenna, a WiFi antenna, and a radio frequency antenna. The communications circuit 204 may include a wireless-frequency transceiver having a variable gain amplifier that generates radio-frequency signals for transmission. A wireless amplifier circuit may be used to amplify the radio-frequency signals at the output of the variable gain amplifier for transmission through a plurality of antennas.

The second memory 208 is configured to store second program instructions. In one embodiment, the memory may include any computer-readable medium known in the art including, for example, volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes.

The second processor 206 cooperates with the second memory 208 to receive and execute the second program instructions. The second processor 206 may be implemented as one or more microprocessors, microcomputers, microcontrollers, digital signal processors, central processing units, state machines, logic circuitries, and/or any devices that manipulate signals based on operational instructions.

In operation, the second processor 206 may be configured to identify a cluster of neighboring smartphones equipped with the native smartphone clustering application 200. As each of the plurality of smartphones (102, 104, 106) having native smartphone clustering application 200 are cooperatively coupled with each other, the smartphone is capable of identifying a pre-established cluster or may be configured to make a new cluster based upon a number of factors such as shared itinerary, and a geolocation which lies within a range of nearby smartphones, etc. As the smartphones may be moving, the cluster may form and reform based on the relative positions of the smartphones in a cluster. As near field communications have a transmission range of approximately 10 meters, each smartphone may identify a neighboring smartphone in the cluster by a received near field signal strength.

After identifying the cluster of the neighboring smartphones, the second processor 208 of each smartphone may be configured to determine a cluster head in the identified cluster of the plurality of smartphones (102, 104, 106). In an example, the second processor 206 is configured to determine the cluster head by calculating a cost function. In an example, the cost function is defined as a number that indicates the characteristics of a particular smartphone with respect to several functions, such as the impact of choosing the particular smartphone as the cluster head. The cost function represents the expected performance of each smartphone when the smartphone elected as the cluster head. In calculating the cost function, various elements are considered as shown below.

For example, if a group of pedestrians is walking towards a shared location, so as to converge upon the shared location, a cluster may be formed by the group of pedestrians, if those pedestrians have each downloaded and registered the smart clustering application to their smartphone.

The second processor 206 is configured to calculate the cost function, $Cost_i$, of each smartphone.

The cost function is calculated based on different factors that ensure the QoS of the network and fairness among all participating nodes. Smartphones with lower cost values are more likely to be selected as cluster heads. The following is the cost function which calculates the clustering cost, $cost_i$, of node (i):

$$cost_i = \alpha H_i + \beta M_i + \gamma \beta_i$$

where $H_i$, $M_i$ and $\beta_i$ are the clustering cost parameters: history, mobility and available battery, respectively. All parameters values are normalized between 0 and 1. Coefficients $\alpha$, $\beta$ and $\gamma$ determine the weight of each cost parameter to the total clustering cost of the node where:

$$\alpha + \beta + \gamma = 1.$$

The parameters weights may be constrained by $\alpha > \beta > \gamma$; although other constraints may be chosen. The most weight is given to the node's history to ensure fairness, which is important in such distributed clustering scenario. The weight of node mobility is rated next in importance because it has a significant impact on the stability of the network.

The following is description of all parameters:

History of the smartphone participation: To balance the load among all nodes and ensure fairness, it is important to consider the node history. Nodes with longer times serving as cluster heads should be avoided, so higher cost is assigned to those nodes, thus they are less likely to be selected as cluster heads. The history cost is calculated using the following formula:

$$H_i = \frac{Tch_i}{Tch_i + Trn_i}$$

where H, is the history cost of the node (i) which is computed by dividing the time spent as cluster head, $T_{ch_i}$, by the total time the node spent as cluster head and regular nodes, $T_{m_i}$. Note that the time a node spends as a trivial cluster head (not connected to any cluster) is not counted into the history cost.

Mobility ($M_i$): mobility refers to the node movement. Nodes that are less mobile should have higher likelihood of being selected as cluster heads. Frequent movement of cluster heads may cause more frequent handoffs, which may have a severe impact on the stability of the network and increase the power consumption as nodes spend less times as regular nodes due to the frequent handoffs, not to mention the clustering operations overhead.

Available Battery ($B_i$): smartphones with higher available battery power are preferred to be selected as cluster heads. Available battery is counted as percentage and can be retrieved from the smartphone system. The battery cost, $B_i$, of a smartphone$_i$, can be computed as follows:

$$B_i = \frac{1}{BP_i},$$

where $BP_i$ is the percentage of battery remaining power as provided by the smartphone system API.

The second processor 206 shares the calculated cost function with each of the neighboring smartphones over the near field antenna of each smartphone. The smartphone with the lowest cost function is designated as the cluster head in the cluster. The native smartphone clustering application enables each smartphone to calculate the cost function and identify the cluster head within the group of smartphones. The native smartphone clustering application further enables each smartphone to join a cluster based on distance of the smartphone to the other smartphones and the shared information.

Smartphone clustering should be distributed and nodes should make their own decision to become cluster heads or join a cluster based on the information they have locally. Every smartphone should be a cluster head or a regular node.

The second processor 206 transmits the personal information associated with each of the smartphone to the determined cluster head via the communications circuit 204, using the near field antenna. In an example, the personal information may include the medical conditions or an SOS message. In an embodiment, the smartphone clustering application downloaded by the smartphone is configured to monitor the medical condition of the owner of the smartphone such as respiratory rate, blood pressure, pulse rate, respiration, oxygen saturation, body temperature. The smartphone may include accessories and/or other smartphone applications which enable it to monitor the medical conditions. The accessories may include a smart watch, a fitness band, sensing arm bands, and such accessories, that can monitor respiratory rate, blood pressure, pulse rate, respiration, oxygen saturation, body temperature and such aspects. In an aspect of the present disclosure, the native smartphone clustering application 200 provides an interface to the owner through which the owner can send the SOS message in case of emergency and is further configured to provide an updated position on an itinerary map. The SOS message and updated position are sent by near field communications to the cluster head, which transmits the SOS message and its GPS position over WiFi to the access point 108, which in turn transmits the SOS message and the GPS position of the cluster head to the server side smart phone clustering application 152. In some examples, the smartphone clustering application automatically communicates the SOS message when there is an emergency medical condition detected.

In an example, the smartphone which was elected/determined as the cluster head is configured to receive the personal information from each of the neighboring smartphones via the communications circuit 204 using near field communications. After receiving personal information from all the smartphones, the second computing circuitry 202 of the cluster head is configured to aggregate the personal information associated with the cluster head with the received personal information from the other neighboring smartphones and to generate aggregated personal information. In some examples, the cluster head is configured to determine the real-time position of the cluster head using a positioning module. In an example, the positioning module can be a satellite positioning module (a GPS positioning module) or a Global Navigation Satellite Systems (GNSS) module.

The second computing circuitry 202 of the cluster head may be configured to combine the determined real position with the aggregated personal information and generate the communication stream. Using the WiFi antenna, the cluster head is configured to transmit the communication stream to the access point 108.

The access point 108 is configured to further transmit the communication stream to the server side smartphone clustering application 152 of the server 150. The access point 108 serves as a connection or medium for other devices to gain access to the Internet or to other devices in the network. In an example, the access points are Node B, eNodeB, radio network controller ("RNC"), base station ("BS"), radio base station ("RB S"), base station controller ("BSC"), transmission/reception base station ("BTS"), transceiver function ("TF"), wireless transceiver, wireless router, basic service set ("BSS"), extended service set ("ESS"), or some other similar term, either as may be implemented or known as either.

Figure 3:
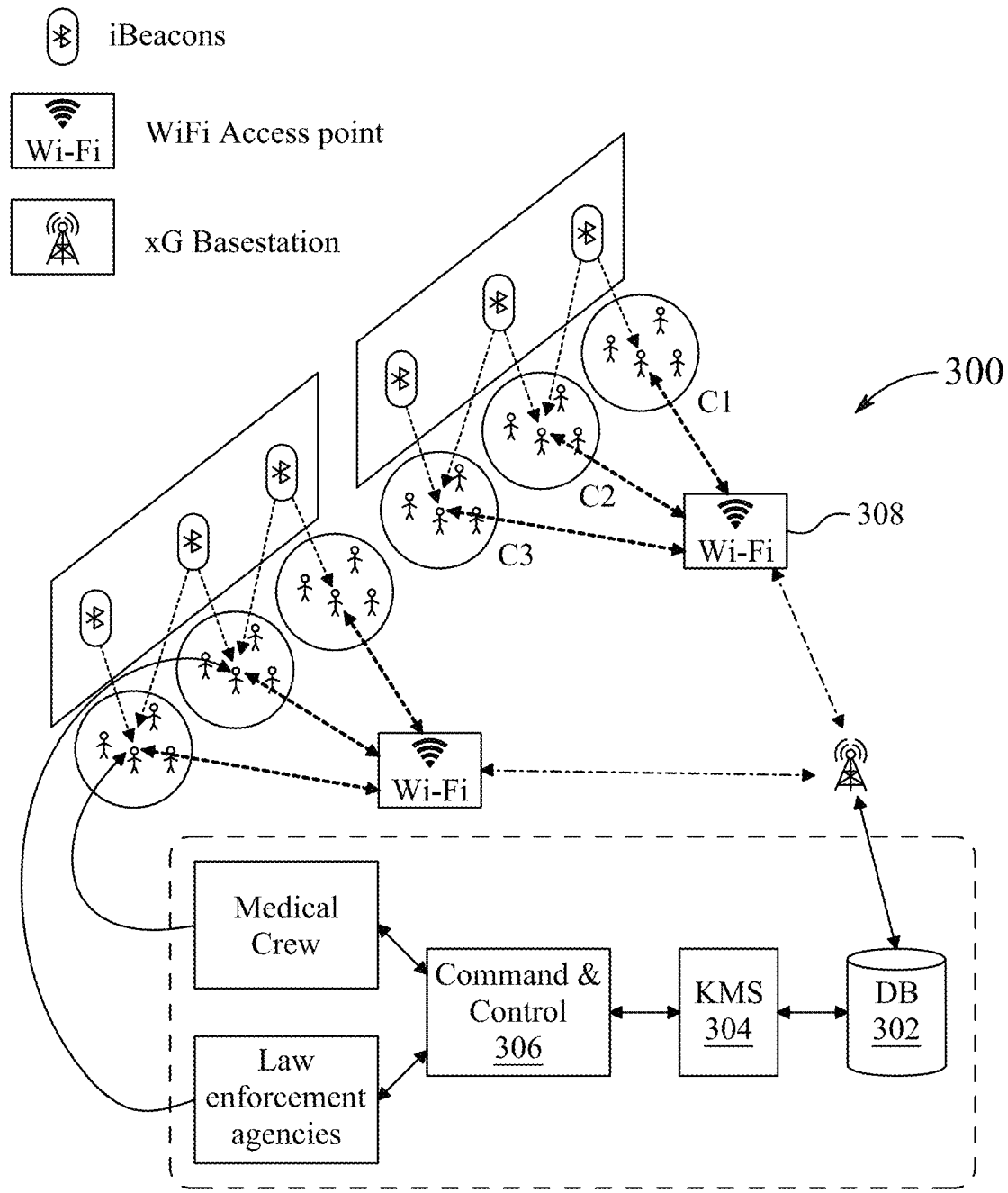
FIG. 3 illustrates a network diagram of a smartphone clustering application, according to certain embodiments.

FIG. 3 illustrates a network diagram of a smartphone clustering application.

As shown in FIG. 3, in an operative embodiment, there are a plurality of clusters (C1, C2, C3 . . . ) configured to communicate with a KMS (Key Management Server or referred as server) (hereinafter interchangeably referred to as "KMS 304") via an access point 308 over a network. Each of the clusters (C1, C2, C3 . . . ) has a plurality of smartphones capable of exchanging data with each other using Bluetooth Low Energy (BLE) communication. Using BLE communication, the smartphones can stay connected with each other without requiring the use of power intensive communication channels, thereby reducing power consumption and preserving battery life of each smartphone.

The smartphone having the native smartphone clustering application 200 may be configured to form a new cluster based upon proximity of the neighboring smartphones having the native smartphone clustering application 200. In the cluster of smartphones, one smartphone is elected as cluster head by determining that it has the lowest cost function in the cluster. To save energy, instead of each smartphone directly communicating with the KMS 304 to share its personal data and position data, the cluster head receives the personal data from all the smartphones of the cluster through BLE. The cluster head of each of the clusters (C1, C2, C3 . . . ) aggregates its personal data and position data along with the received data from all the smartphones and generates a communication stream. The cluster head is further configured to share the generated communication stream with the KMS 304 via the access point 308. In this way, only the cluster head uses energy to determine the position and to communicate with the KMS 304, resulting in an energy efficient real-time tracking system.

The access point 308 acts as a connecting point between the plurality of clusters (C1, C2, C3 . . . ) and the KMS 304. In an example, the access point 308 is a WiFi access point.

The access point 308 is configured to forward the received communication stream from the each of the cluster heads towards the KMS 304.

The KMS 304 is configured to receive the forwarded communication stream from the access point 308. The KMS 304 is commutatively coupled with a database 302. The database 302 is configured to store a profile of each smartphone, whereas the profile stores the information such as name, age, address, contact, medical conditions, preferred medical professional used by the owner of the smartphone, and itinerary of the owner of the smartphone. The KMS 304 is configured to extract the personal data and position data from the received communication stream and further correlates the personal data with the medical conditions fetched from the database 302 for each smartphone. In the event the personal data associated with a particular smartphone does not match the stored medical conditions, the KMS 304 generates a notification message and transmits the generated notification message to the medical crew (based upon distance and availability) and medical professional indicated by the owner of the particular smartphone via a command and control unit 306. The command and control unit 306 may be configured to maintain a real time record of the medical crews and the law enforcement agencies available near the location of the cluster head, and sends the notification message to the nearest available medical crew and law enforcement agency to take a suitable action. The notification message includes information about the real-time position of the cluster head, and the medical condition of the particular owner of the smartphone.

The KMS 304 is configured to correlate the extracted position information with the stored itinerary of a respective owner of a smartphone fetched from the database 302. In the event the extracted position of the particular smartphone is not at the expected position based on the itinerary, the KMS 304 is configured to generate a notification message. In an embodiment, the notification message includes the itinerary of the owner of the particular smartphone and the position of the cluster head. Using the command and control unit 306, the KMS 304 is configured to transmit the generated notification message to the plurality of the smartphones (102, 104, 106) and the law enforcement agency.

Figure 4:
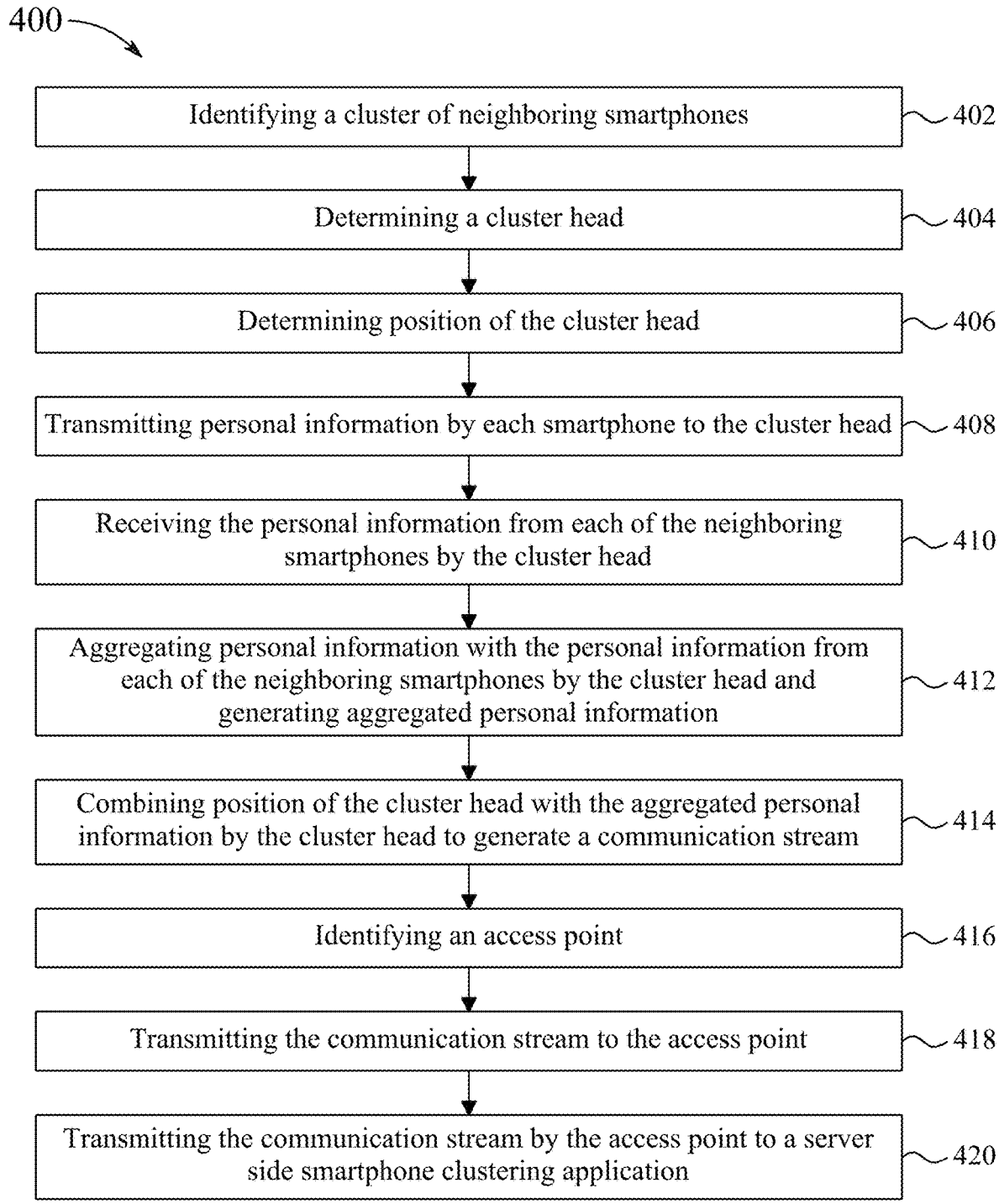
FIG. 4 illustrates a process flow for using a smartphone clustering application, according to certain embodiments.

FIG. 4 illustrates a process flow 400 for a process flow for using a smartphone clustering application, according to certain embodiments.

Step 402 includes identifying a cluster of neighboring smartphones equipped with the native smartphone clustering application by each smartphone which is also equipped with the native smartphone clustering application 200.

Step 404 includes determining a cluster head by each smartphone in the identified cluster. In an embodiment, each smartphone may be configured to determine the cluster head by calculating a cost function. After calculating the cost function, each smartphone is configured to share the cost function with each of the neighboring smartphones over near-field communication. After sharing and comparing the cost functions associated with each of the smartphones, the smartphone having the lowest cost function is identified as the cluster head. The non-limiting calculated cost function for each smartphone includes:
  determining its position relative to at least one access point;
  calculating a number of the smartphones in the cluster;
  determining its transmission capabilities;
  determining its battery energy;
  determining an elapsed time since the smartphone has served as a cluster head; and
  determining the reputation of each of the neighboring smartphones.

Step 406 includes determining the position of the cluster head by the cluster head.

Step 408 includes transmitting the personal information to the cluster head by each smartphone in the cluster over near-field communication.

Step 410 includes receiving the personal information from each of the neighboring smartphones by the cluster head.

Step 412 includes aggregating the personal information of the cluster head with the personal information from each of the neighboring smartphones by the cluster head.

Step 414 includes combining the position of the cluster head with the aggregated personal information by the cluster head to generate a communication stream.

Step 416 includes identifying an access point 108 by the cluster head.

Step 418 includes transmitting the communication stream by the cluster head to the access point 108.

Step 420 includes transmitting the communication stream by the access point to a server side smartphone clustering application 152.

Figure 5:
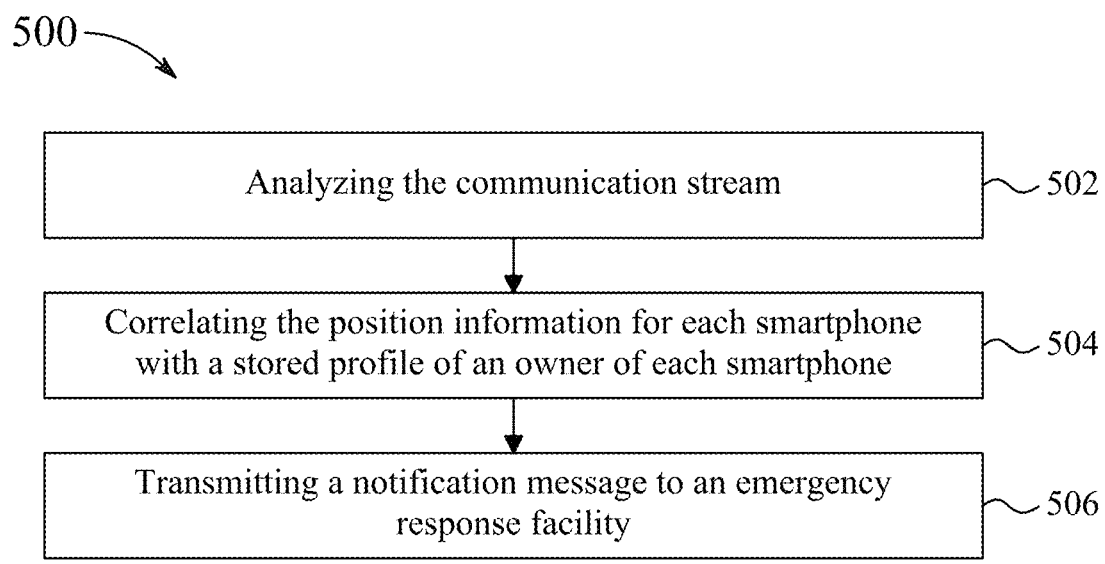
FIG. 5 illustrates a process flow performed by a server side smartphone clustering application, according to certain embodiments.

FIG. 5 illustrates a process flow performed by the server side smartphone clustering application 152, according to certain embodiments.

Step 502 includes analyzing the communication stream at the server side smartphone clustering application 152. In an embodiment, a server 150 having the server side smartphone clustering application 152 is configured to receive the communication stream from the access point 108.

Step 504 includes correlating the position information for each smartphone with a stored profile of an owner of each smartphone. In an embodiment, a first processor 158 of the server 150 is configured to extract the position information from the communication stream. The first processor 158 is commutatively coupled with the database 162 having profile of each of the smartphone. In an embodiment, the stored profile includes name, age, address, contact, medical conditions, medical professional, and itinerary of the owner of the smartphone. The first processor 158 is configured to correlate the extracted position with the stored itinerary of the owner of the smartphone fetched from the database 162. In case, if a smartphone is not at an expected position based on the itinerary, the server 150 is configured to generate a notification message.

The first processor 158 of the server 150 is also configured to extract the personal information from the communication stream. The first processor 158 is configured to correlate the extracted personal information with the stored medical conditions of the owner of the smartphone fetched from the database 162. When the personal information indicates a medical emergency of the owner of the smartphone, the server 150 is configured to generate the notification message.

When the personal information indicates the owner of a smartphone in the cluster is being attacked, the server 150 is configured to generate the notification message.

Step 506 includes transmitting the notification message via the network interface 164 to an emergency response facility (for example, law enforcement agencies, crowd control entities and medical professionals and/or the KMS). In an example, the notification message includes the itinerary of the owner of the smartphone, personal information of the owner of the smartphone, the medical conditions of the owner of the smartphone, and the position of the cluster head.

In an example, the server side smartphone clustering application 152 may be configured to monitor the environment near the position of the cluster head for identifying dangerous event. If any dangerous event is identified, the server 150 may be configured to transmit an alert to each smartphone in the cluster via the network interface.

If the identified dangerous event is fire, the server 150 may be configured to transmit instructions to each smartphone of emergency escape routes, and transmit a notification message to a firehouse simultaneously. The notification message includes the number of smartphones in the cluster and the position of the cluster head.

The first embodiment is illustrated with respect to FIGS. 1-5. The first embodiment describes the method for using the smartphone clustering application. The method includes identifying, by each smartphone equipped with the smartphone clustering application, the cluster of neighboring smartphones equipped with the smartphone clustering application; determining, by each smartphone in the cluster, the cluster head; determining, by the cluster head, its position; transmitting over near field communication, by each smartphone in the cluster, personal information to the cluster head; receiving, by the cluster head, the personal information from each of the neighboring smartphones; aggregating, by the cluster head, its personal information with the personal information from each of the neighboring smartphones, thus generating aggregated personal information; combining, by the cluster head, its position with the aggregated personal information into the communication stream; identifying, by the cluster head, the access point 108; transmitting, by the cluster head, the communication stream to the access point 108; and transmitting, by the access point, the communication stream to the server side smartphone clustering application.

The method further includes determining the cluster head by each smartphone, by calculating the cost function; and sharing, by each smartphone, over near field communication, its cost function with each of the neighboring smartphones.

The method further includes identifying, by each smartphone in the cluster, the smartphone with the lowest cost function as the cluster head.

The method wherein calculating the cost function comprises calculating the following equation:

$$cost_i = \alpha H_i + \beta M_i + \gamma \beta_i$$

where $H_i$ is a clustering cost parameter representing a history of a smartphone (i) as a cluster head, $M_i$ represents a mobility of the smartphone (i) and $\beta_i$ represents an available battery of the smartphone (i), coefficients $\alpha$, $\beta$ and $\gamma$ determine the weight of each cost parameter to the total clustering cost of the node where:

$$\alpha + \beta + \gamma = 1,$$

subject to the constraint that:

$$\alpha > \beta > \gamma.$$

The method further includes calculating the cost function for each smartphone by:
 determining its position relative to at least one access point;
 calculating a number of the smartphones in the cluster;
 determining its transmission capabilities;
 determining its battery energy;
 determining an elapsed time since the smartphone has served as a cluster head; and
 determining the reputation of each of the neighboring smartphones.

The method further includes analyzing the communication stream at the server side smartphone clustering application; correlating the position information for each smartphone with the stored profile of the owner of each smartphone, wherein the stored profile includes an itinerary of the owner of the smartphone; and when the smartphone is not at an expected position based on the itinerary, transmitting the notification message to the emergency response facility, wherein the notification message includes the itinerary of the owner of the smartphone and the position of the cluster head.

The method further includes analyzing the communication stream at the server side smartphone clustering application; correlating the personal information for each smartphone with the stored profile of an owner of each smartphone, wherein the stored profile includes medical conditions of the owner of the smartphone and the medical professional used by the owner of the smartphone; and when the personal information indicates the medical emergency of the owner of the smartphone, transmitting the notification message to the medical professional, wherein the notification message includes the personal information of the owner of the smartphone, the medical conditions of the owner of the smartphone, and the position of the cluster head.

The method further includes analyzing the communication stream at the server side smartphone clustering application; correlating the personal information for each smartphone with the stored profile of an owner of each smartphone; and when the personal information indicates the owner of the smartphone in the cluster is being attacked, transmitting a notification message to the law enforcement agency, wherein the notification message includes the personal information of the owner of the smartphone and the position of the cluster head.

The method further includes analyzing, by the server side smartphone clustering application, the communication stream; monitoring, by the server side smartphone clustering application, for dangerous events occurring near the position of the cluster head; when the dangerous event is identified, transmitting, by the network interface, the alert to each smartphone in the cluster.

When the dangerous event is identified as a fire, the method further includes, transmitting instructions to each smartphone of emergency escape routes, and transmitting a notification message to a firehouse, wherein the notification message includes the number of smartphones in the cluster and the position of the cluster head.

The second embodiment is illustrated with respect to FIGS. 1-5. The second embodiment describes the smartphone clustering application system 100. The system 100 includes the plurality of smartphones (102, 104, 106), the access point 108, the server side smartphone clustering application 152 stored on the server 150, and the native smartphone clustering application.

The server side smartphone clustering application 152 includes the first computing circuitry 154, the one or more first processors 158, the first memory 156 storing first program instructions, wherein the first program instructions are executed by the one or more first processors 158 to perform server side smartphone clustering, the registration interface 160 configured to register each smartphone with the server side application, the database 162 configured to store personal information of the owner of each smartphone registered with the server side smartphone clustering application, and a network interface configured to transmit communications to the plurality of smartphones (102, 104, 106).

The native smartphone clustering application 200 is configured to be downloaded from the server side smartphone clustering application 152 by each smartphone. Each smartphone (102, 104, 106) includes the second computing circuitry 202, the communications circuit 204 including a near field antenna, a WiFi antenna and a radio frequency antenna, one or more second processors, the second memory 208 storing second program instructions, wherein the second program instructions are executed by the one or more second processors 206 to: identify a cluster of neighboring smartphones equipped with the native smartphone clustering application; determine a cluster head; and transmit, over the near field antenna, personal information to the cluster head. The smartphone of the cluster head is configured to: receive the personal information from each of the neighboring smartphones; aggregate, by the second computing circuitry 202 of the cluster head, its personal information with the personal information from each of the neighboring smartphones, and generate aggregated personal information; determine its position; combine, by the second computing circuitry 202 of the cluster head, its position with the aggregated personal information into a communication stream; transmit, by the WiFi antenna, the communication stream to the access point 108; and wherein the access point 108 is configured to transmit the communication stream to the server side smartphone clustering application.

The one or more second processors 206 are configured to execute the second program instructions to: determine the cluster head by calculating the cost function; and share, over the near field antenna of each smartphone, the cost function with each of the neighboring smartphones.

The system includes wherein the one or more second processors 206 are configured to execute the second program instructions to identify, by each smartphone in the cluster, the smartphone with the lowest cost function as the cluster head.

The system includes wherein the one or more second processors 206 are configured to execute the second program instructions to:

calculate the cost function according to the following equation:

$$cost = \alpha H_i + \beta M_i + \gamma \beta_i$$

where $H_i$ is a clustering cost parameter representing a history of a smartphone (i) as a cluster head, $M_i$ represents a mobility of the smartphone (i) and $\beta_i$ represents an available battery of the smartphone (i), coefficients $\alpha$, $\beta$ and $\gamma$ determine the weight of each cost parameter to the total clustering cost of the node where:

$$\alpha + \beta + \gamma = 1,$$

subject to the constraint that:

$$\alpha > \beta > \gamma.$$

The one or more second processors 206 are configured to execute the second program instructions to calculate the cost function based on:

a position of the smartphone relative to at least one access point;
a calculation of a number of the smartphones in the cluster;
a transmission capability of the smartphone;
a battery energy of the smartphone;
an elapsed time since the smartphone has served as a cluster head; and
a reputation of each of the neighboring smartphones.

The one or more first processors 158 are configured to execute the first program instructions of the server side smartphone clustering application 152 to: analyze the communication stream; correlate the position information for each smartphone with the stored profile of an owner of each smartphone, wherein the stored profile includes the itinerary of the owner of the smartphone; and when the smartphone is not at an expected position based on the itinerary, transmit a notification message to an emergency response facility, wherein the notification message includes the itinerary of the owner of the smartphone and the position of the cluster head.

The one or more first processors 158 are configured to execute the first program instructions of server side smartphone clustering application 152 to: analyze the communication stream; correlate the personal information for each smartphone with the stored profile of an owner of each smartphone, wherein the stored profile includes medical conditions of the owner of the smartphone and the medical professional used by the owner of the smartphone; and when the personal information indicates a medical emergency of the owner of the smartphone, transmit a notification message to the medical professional, wherein the notification message includes the personal information of the owner of the smartphone, the medical conditions of the owner of the smartphone, and the position of the cluster head.

The one or more first processors 158 are configured to execute the first program instructions of server side smartphone clustering application 152 to: analyze the communication stream; correlate the personal information for each smartphone with the stored profile of an owner of each smartphone; when the personal information indicates the owner of a smartphone in the cluster is being attacked, transmit a notification message to the law enforcement agency, wherein the notification message includes the personal information of the owner of the smartphone and the position of the cluster head.

The one or more first processors 158 are configured to execute the first program instructions of server side smartphone clustering application 152 to: analyze the communication stream; monitor for dangerous events occurring near the position of the cluster head; and when the dangerous event is identified, transmit an alert to each smartphone in the cluster, wherein the alert includes emergency escape routes.

The third embodiment is illustrated with respect to FIGS. 1-5. The third embodiment describes a non-transitory computer readable medium having instructions stored therein that, when executed by one or more processors, cause the one or more processors to perform a method for using a smartphone clustering application. The method includes identifying, by each smartphone equipped with the smartphone clustering application, the cluster of neighboring smartphones equipped with the smartphone clustering application; determining, by each smartphone in the cluster, a cluster head; determining, by the cluster head, its position; transmitting over near field communication, by each smartphone in the cluster, personal information to the cluster head; receiving, by the cluster head, the personal information from each of the neighboring smartphones; aggregating, by the cluster head, its personal information with the personal information from each of the neighboring smartphones, thus generating aggregated personal information; combining, by the cluster head, its position with the aggregated personal information into a communication stream; identifying, by the cluster head, an access point; transmitting, by the cluster head, the communication stream to the access point; and transmitting, by the access point, the communication stream to a server side smartphone clustering application.

The non-transitory computer readable medium method further includes determining, by each smartphone, the cluster head by calculating the cost function; sharing, by each smartphone, over near field communication, its cost function with each of the neighboring smartphones; and identifying, by each smartphone in the cluster, the smartphone with the lowest cost function as the cluster head.

The non-transitory computer readable medium method further includes calculating the cost function for each smartphone including:

determining its position relative to at least one access point;
   calculating a number of the smartphones in the cluster;
   determining its transmission capabilities;
   determining its battery energy;
   determining an elapsed time since the smartphone has served as a cluster head; and
   determining the reputation of each of the neighboring smartphones.

The non-transitory computer readable medium method calculating the cost function for each smartphone (i) by calculating the following equation:

$$cost = \alpha H_i + \beta M_i + \gamma \beta_i$$

where $H_i$ is a clustering cost parameter representing a history of the smartphone (i) as a cluster head, $M_i$ represents a mobility of the smartphone (i) and $\beta_i$ represents an available battery of the smartphone (i), coefficients $\alpha$, $\beta$ and $\gamma$ determine the weight of each cost parameter to the total clustering cost of the node where:

$$\alpha + \beta + \gamma = 1,$$

subject to the constraint that:

$$\alpha > \beta > \gamma.$$

Figure 6:
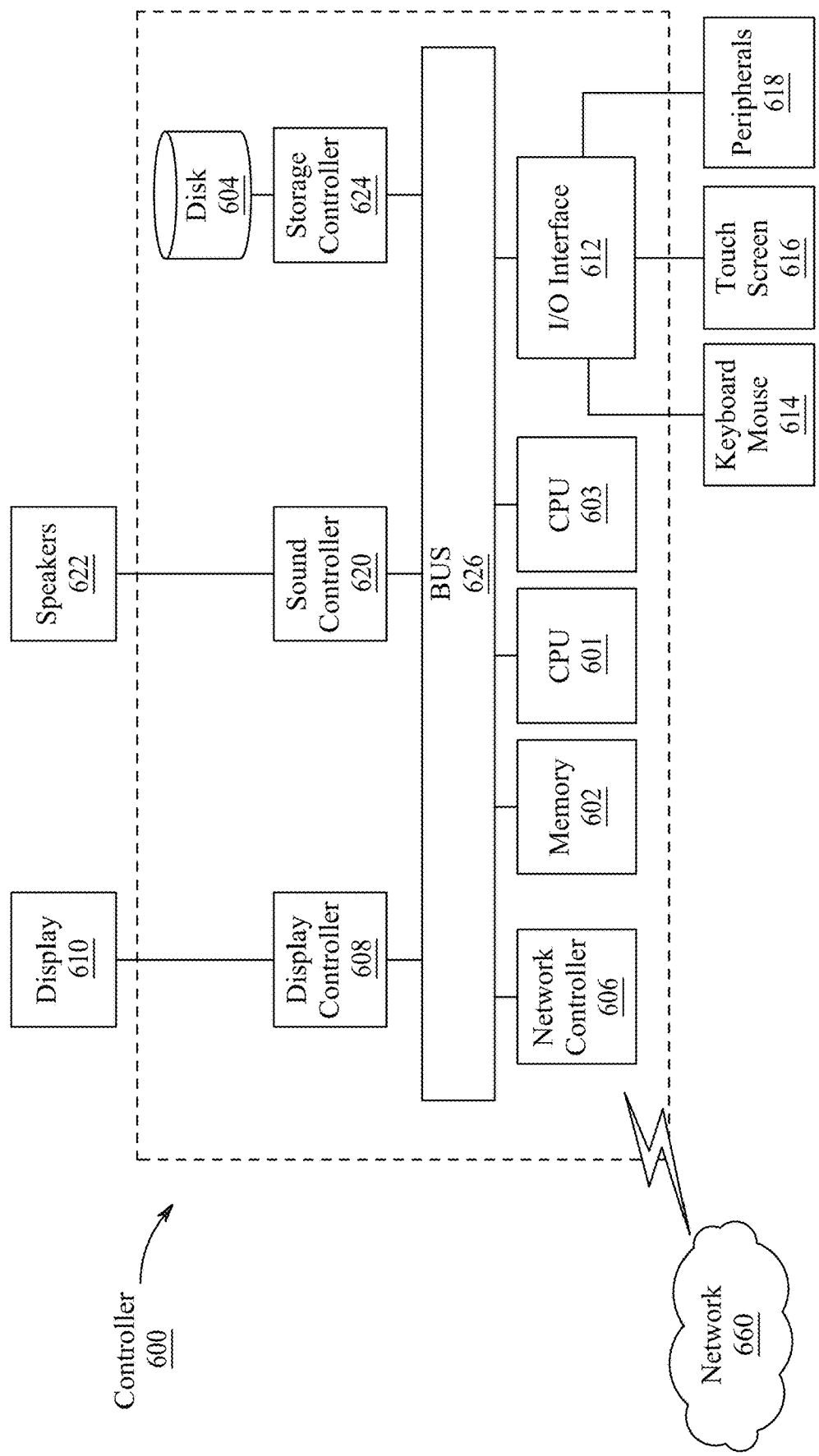
FIG. 6 is an illustration of a non-limiting example of details of computing hardware used in the computing system, according to certain embodiments.

Next, further details of the hardware description of the computing environment of FIG. 1, according to exemplary embodiments are described with reference to FIG. 6. In FIG. 6, a controller 600 is described is representative of the system 100 of FIG. 6 in which the controller is a computing device which includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 10, Microsoft Windows 11, UNIX, Oracle Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks. The network 660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 704 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
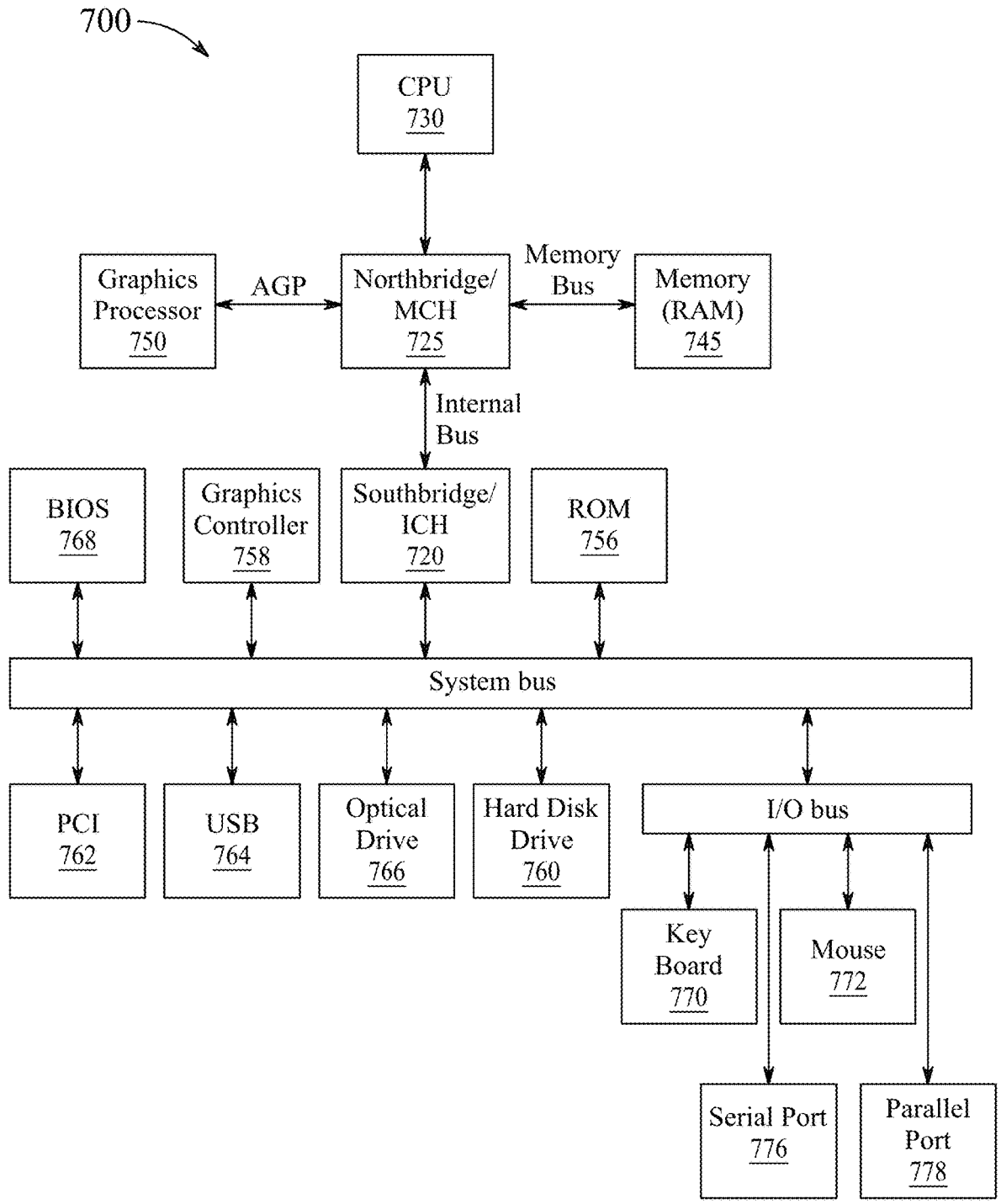
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
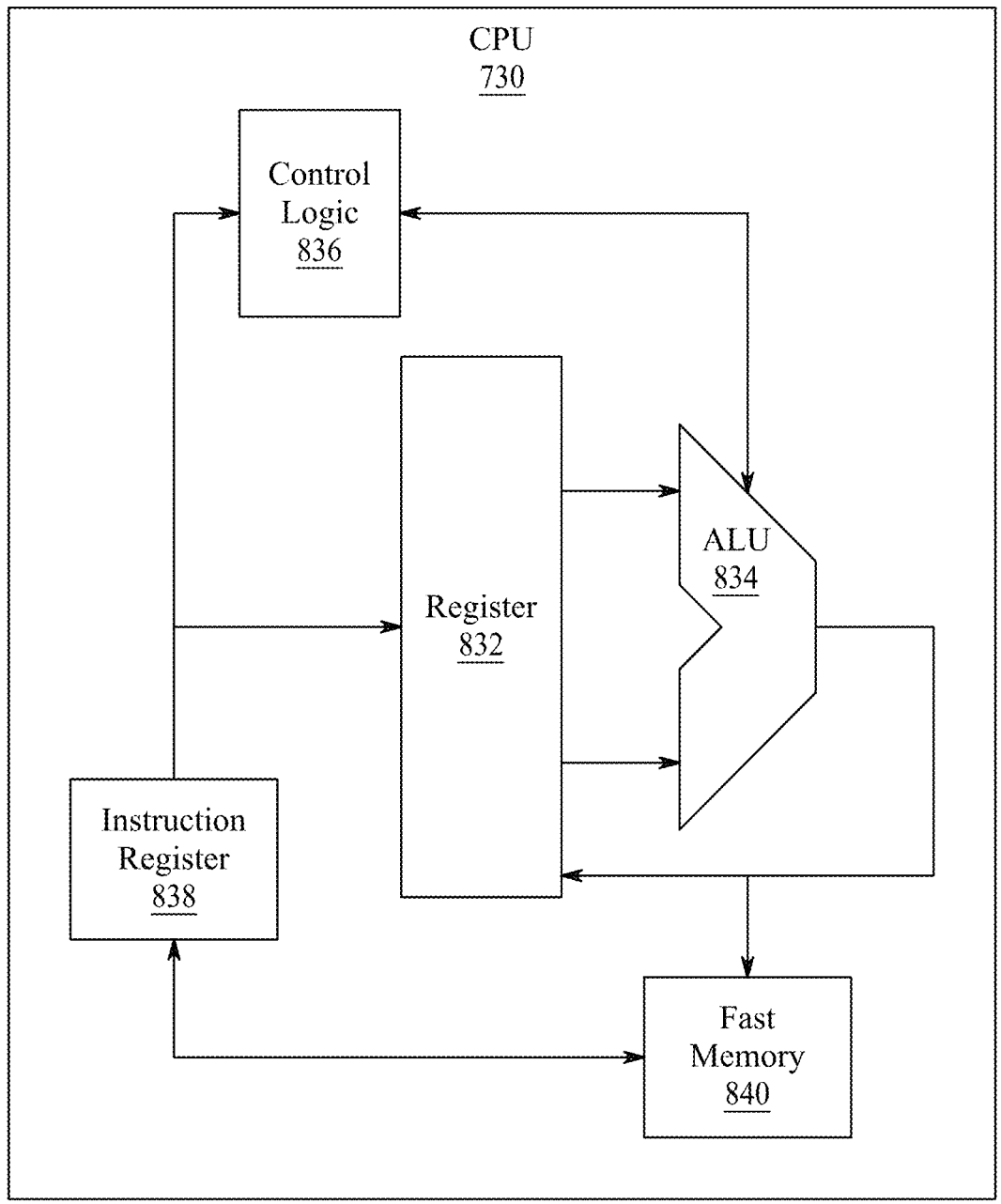
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions are fetched from the instruction register 838 by the control logic 836 and interpreted according to the instruction set architecture of the CPU 730. Part of the instructions can also be directed to the register 832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 720 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 9:
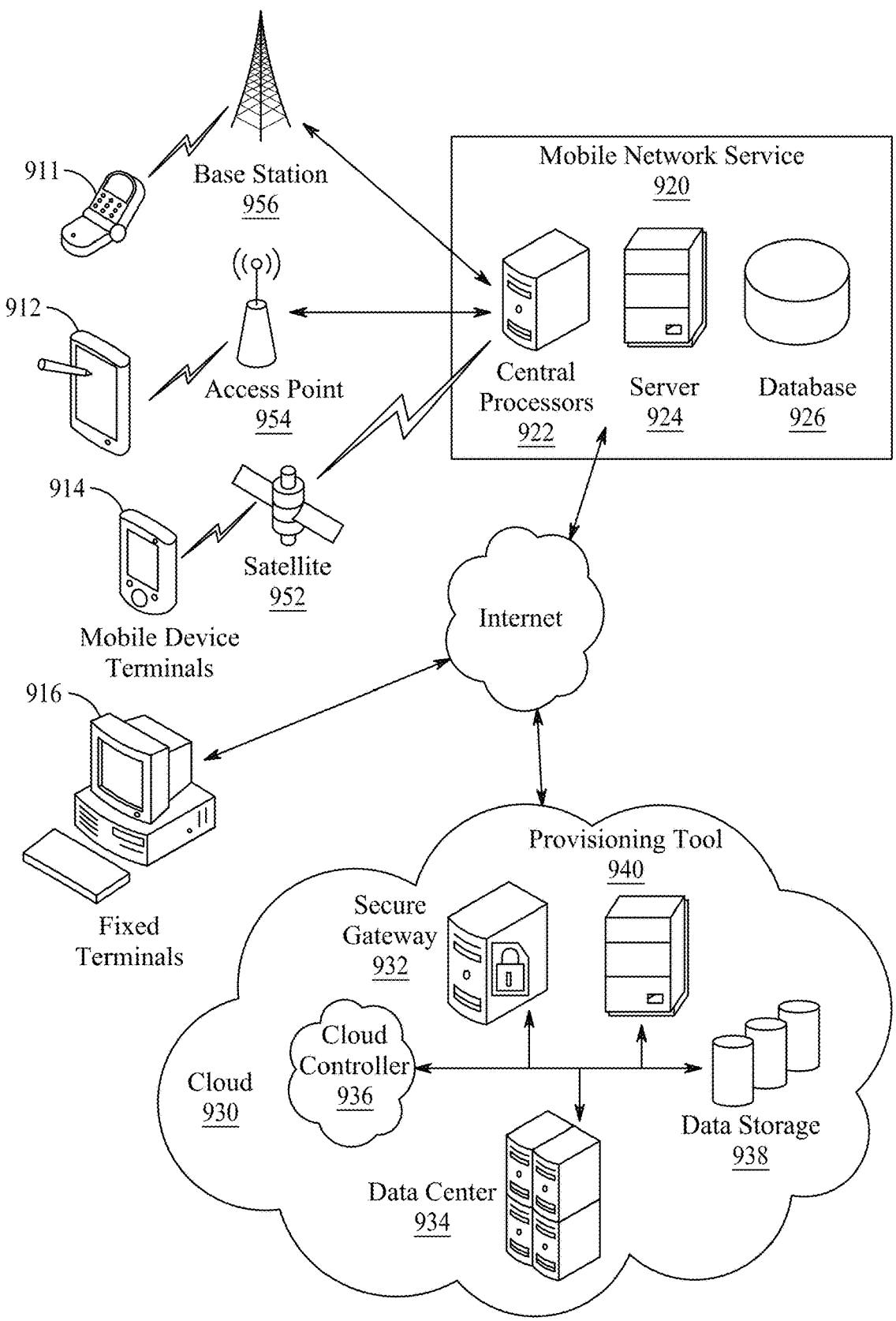
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for using a smartphone clustering application, comprising:
   identifying, by each smartphone equipped with the smartphone clustering application, a cluster of neighboring smartphones equipped with the smartphone clustering application;
   determining, by each smartphone in the cluster, a cluster head;
   determining, by the cluster head, its position;
   transmitting over near field communication, by each smartphone in the cluster, personal information to the cluster head;
   receiving, by the cluster head, the personal information from each of the neighboring smartphones;
   aggregating, by the cluster head, its personal information with the personal information from each of the neighboring smartphones, thus generating an aggregated personal information;
   combining, by the cluster head, its position with the aggregated personal information into a communication stream;
   identifying, by the cluster head, an access point;
   transmitting, by the cluster head, a communication stream to the access point;
   transmitting, by the access point, the communication stream to a server side smartphone clustering application;
   determining, by each smartphone, the cluster head by calculating a cost function;
   sharing, by each smartphone, over near field communication, its cost function with each of the neighboring smartphones; and
   identifying, by each smartphone in the cluster, the smartphone with the lowest cost function as the cluster head,
   wherein calculating the cost function comprises:
   calculating the following equation:

$$\mathrm{cost}_i = \alpha H_i + \beta M_i + \gamma \beta_i$$

where $H_i$ is a clustering cost parameter representing a history of a smartphone (i) as a cluster head, $M_i$ represents a mobility of the smartphone (i) and $\beta_i$ represents an available battery of the smartphone (i), coefficients α, β and γ determine the weight of each cost parameter to the total clustering cost of the node where:

$$\alpha+\beta+\gamma=1,$$

subject to the constraint that:

$$\alpha>\beta>\gamma;$$

determining position information for each smartphone relative to at least one access point;

correlating the position information for each smartphone with a stored profile of an owner of each smartphone, wherein the stored profile includes an itinerary of the owner of the smartphone; and when a smartphone is not at an expected position based on the itinerary, transmitting a notification message to an emergency response facility, wherein the notification message includes the itinerary of the owner of the smartphone and the position of the cluster head.

2. The method of claim 1, wherein calculating the cost function further comprises:

for each smartphone:
determining its history as a cluster head;
calculating a number of the smartphones in the cluster;
determining its transmission capabilities;
determining its battery energy;
determining an elapsed time since the smartphone has served as the cluster head; and
determining the reputation of each of the neighboring smartphones.

3. The method of claim 2, further comprising:

analyzing the communication stream at the server side smartphone clustering application;

correlating the personal information for each smartphone with a stored profile of an owner of each smartphone, wherein the stored profile includes medical conditions of the owner of the smartphone and a medical professional used by the owner of the smartphone; and when the personal information indicates a medical emergency of the owner of the smartphone, transmitting a notification message to the medical professional, wherein the notification message includes the personal information of the owner of the smartphone, the medical conditions of the owner of the smartphone, and the position of the cluster head.

4. The method of claim 2, further comprising:

analyzing the communication stream at the server side smartphone clustering application;

correlating the personal information for each smartphone with a stored profile of an owner of each smartphone; and when the personal information indicates the owner of a smartphone in the cluster is being attacked, transmitting a notification message to a law enforcement agency, wherein the notification message includes the personal information of the owner of the smartphone and the position of the cluster head.

5. The method of claim 2, further comprising:

analyzing, by the server side smartphone clustering application, the communication stream;

monitoring, by the server side smartphone clustering application, for dangerous events occurring near the position of the cluster head;

when a dangerous event is identified, transmitting, by the network interface, an alert to each smartphone in the cluster.

6. The method of claim 2, further comprising:

when the dangerous event is identified as a fire, transmitting instructions to each smartphone of emergency escape routes, and transmitting a notification message to a firehouse, wherein the notification message includes the number of smartphones in the cluster and the position of the cluster head.

7. A smartphone clustering application system, comprising:

a plurality of smartphones;
an access point;
a server side smartphone clustering application stored on a server, the server side smartphone clustering application including:
a first computing circuitry;
one or more first processors;
a first memory storing first program instructions, wherein the first program instructions are executed by the one or more first processors to perform server side smartphone clustering;
a registration interface configured to register each smartphone with the server side smartphone clustering application;
a database configured to store personal information of an owner of each smartphone registered with the server side smartphone clustering application;
a network interface configured to transmit communications to the plurality of smartphones;
a native smartphone clustering application configured to be downloaded from the server side smartphone clustering application by each smartphone, wherein each smartphone includes:
a second computing circuitry;
a communications circuit including a near field antenna, a WiFi antenna and a radio frequency antenna;
one or more second processors;
a second memory storing second program instructions, wherein the second program instructions are executed by the one or more second processors to:
identify a cluster of neighboring smartphones equipped with the native smartphone clustering application;
determine a cluster head;
transmit, over the near field antenna, personal information to the cluster head;
wherein the smartphone of the cluster head is configured to:
receive the personal information from each of the neighboring smartphones;
aggregate, by the second computing circuitry of the cluster head, its personal information with the personal information from each of the neighboring smartphones, and generate aggregated personal information;
determine its position;
combine, by the second computing circuitry of the cluster head, its position with the aggregated personal information into a communication stream;
transmit, by the WiFi antenna, the communication stream to the access point;
wherein the access point is configured to transmit the communication stream to the server side smartphone clustering application, and wherein the second program instructions are executed by the one or more second processors to:
- determine the cluster head by calculating a cost function;
- share, over the near field antenna of each smartphone, the cost function with each of the neighboring smartphones;
- identify, by each smartphone in the cluster, the smartphone with the lowest cost function as the cluster head;
- calculate the cost function according to the following equation:

$$cost_i = \alpha H_i + \beta M_i + \gamma \beta_i$$

where $H_i$ is a clustering cost parameter representing a history of a smartphone (i) as a cluster head, $M_i$ represents a mobility of the smartphone (i) and $\beta_i$ represents an available battery of the smartphone (i), coefficients $\alpha$, $\beta$ and $\gamma$ determine the weight of each cost parameter to the total clustering cost of the node where:

$$\alpha + \beta + \gamma = 1,$$

subject to the constraint that:

$$\alpha > \beta > \gamma;$$

- determine position information for each smartphone relative to at least one access point;
- correlate the position information for each smartphone with a stored profile of an owner of each smartphone, wherein the stored profile includes an itinerary of the owner of the smartphone; and
- when a smartphone is not at an expected position based on the itinerary, transmit a notification message to an emergency response facility, wherein the notification message includes the itinerary of the owner of the smartphone and the position of the cluster head.

8. The smartphone clustering application system of claim 7, wherein the second program instructions of each smartphone are further executed by the one or more second processors to calculate the cost function based on:
- a calculation of a number of the smartphones in the cluster;
- a transmission capability of the smartphone;
- a battery energy of the smartphone;
- an elapsed time since the smartphone has served as a cluster head; and
- a reputation of each of the neighboring smartphones.

9. The smartphone clustering application system of claim 7, wherein the first program instructions of server side smartphone clustering application are further executed by the one or more first processors to:
- analyze the communication stream;
- correlate the personal information for each smartphone with a stored profile of an owner of each smartphone, wherein the stored profile includes medical conditions of the owner of the smartphone and a medical professional used by the owner of the smartphone; and
- when the personal information indicates a medical emergency of the owner of the smartphone, transmit a notification message to the medical professional, wherein the notification message includes the personal information of the owner of the smartphone, the medical conditions of the owner of the smartphone, and the position of the cluster head.

10. The smartphone clustering application system of claim 7, wherein the first program instructions of server side smartphone clustering application are further executed by the one or more first processors to:
- analyze the communication stream;
- correlate the personal information for each smartphone with a stored profile of an owner of each smartphone;
- when the personal information indicates the owner of a smartphone in the cluster is being attacked, transmit a notification message to a law enforcement agency, wherein the notification message includes the personal information of the owner of the smartphone and the position of the cluster head.

11. The smartphone clustering application system of claim 7, wherein the first program instructions of server side smartphone clustering application are further executed by the one or more first processors to:
- analyze the communication stream;
- monitor for dangerous events occurring near the position of the cluster head; and
- when a dangerous event is identified, transmit an alert to each smartphone in the cluster, wherein the alert includes emergency escape routes.

* * * * *